（12) United States Patent
Schenk et al.

(10) Patent No.: US 6,315,436 B1
(45) Date of Patent: Nov. 13, 2001

(54) STORAGE COMPARTMENT FOR VEHICLES

(75) Inventors: Bernd Schenk, Horb; Ralf Zipperle, Althengstett, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/481,469

(22) Filed: Jan. 11, 2000

(30) Foreign Application Priority Data

Jan. 26, 1999 (DE) ................................ 199 02 666

(51) Int. Cl.[7] ........................................ F21V 33/00
(52) U.S. Cl. .................................. 362/488; 362/154
(58) Field of Search .............................. 362/154, 155, 362/489, 488, 496, 501, 546, 548, 253; 200/61.62

(56) References Cited

U.S. PATENT DOCUMENTS

| 3,619,592 | * | 11/1971 | Lamb, Jr. ............................. 362/155 |
| 3,943,351 | * | 3/1976 | Nilsson ................................ 362/496 |
| 5,722,759 | | 3/1998 | Eklov et al. . | |

FOREIGN PATENT DOCUMENTS

| 893450 | 10/1953 | (DE) . |
| 2427015 | 12/1975 | (DE) . |
| 3833499 | 5/1990 | (DE) . |
| 0 928 382 | 12/1961 | (GB) . |
| 928382 | 6/1963 | (GB) . |

* cited by examiner

Primary Examiner—Y. Quach
(74) Attorney, Agent, or Firm—Crowell & Moring LLP

(57) ABSTRACT

A Storage compartment, in particular a glove compartment, for a motor vehicle is provided. The storage compartment includes a compartment housing which has at least two sections, which are arranged one above the other and are separated from one another by a transverse wall, and a compartment opening on the front side allowing access to the sections. For the purpose, with little technical outlay, of sufficiently illuminating the sections lying one above the other, a downwardly shining lamp is arranged in the vicinity of the compartment opening in such a manner on the upper, transversely extending housing wall and at least one reflector is arranged in such a manner on the inside of the flap that in the swung-down position of the flap light from the lamp which impinges on the reflector is reflected into the depth of at least one lower section.

13 Claims, 2 Drawing Sheets

STORAGE COMPARTMENT FOR VEHICLES

CROSS REFERENCE TO RELATED APPLICATION

Priority is claimed with respect to German Application No. 199 02 666.1-21 filed in Germany on Jan. 26, 1999, the disclosure of which is incorporated herein by reference.

BACKGROUND OF THE INVENTION

1. Technical Field

The invention relates to a storage compartment, in particular a glove compartment for vehicles. More specifically, the present invention relates to a glove compartment having multiple storage sections and providing sufficient illumination of each section.

2. Discussion

In a known glove compartment of this type (DE 38 33 499 A1) a security compartment is arranged in the upper housing wall of the compartment divided into an upper and lower storage section by means of a horizontal transverse wall, which security compartment can be swung down from a wall opening into the upper section and then can furthermore be pulled forwards, when it is to be used.

In a glove compartment which is likewise known (DE-C 893 450) a recess is provided in the compartment flap closing the compartment opening, into which recess a reading lamp unit which can be pivoted out is inserted. The reading lamp unit comprises a pivotable support which covers the recess, a lamp which is fastened on the support and a reflector protruding from the support at an acute angle. If the reading lamp unit is pivoted out, the lamp illuminates the knee region of the front passenger directly and via the reflector, with the result that a road map spread out there is lit up well. If the compartment flap is pivoted away in order to open the glove compartment, the reading lamp unit is situated at a distance in front of the compartment opening and the reading lamp illuminates the depth of the compartment interior directly and via the reflector, with the result that the contents stored therein are readily visible. The reflector is designed as a flat mirror.

A glove compartment is already known (DE 24 27 015 A1) whose compartment flap which closes the compartment opening is of a double-shell design with a cavity lying in between and in which a receiving section which is accessible from the inside of the flap is integrated. The receiving section is formed by a moulding in the inner shell of the flap, which moulding is sealed off in a flush manner by a pivotably arranged cover.

SUMMARY OF THE INVENTION

The invention is based on the object, in a storage compartment, in particular a glove compartment, of the type mentioned at the beginning with a compartment interior divided into sections, of ensuring, with little technical outlay, that sufficient illumination of the sections lying one above the other, even in the depth of each section.

The storage compartment according to the invention has the advantage that a single, cost-effective lamp with an integrated switch is sufficient in order to illuminate the sections lying one above the other and not every section needs to be lit up with a separate light source. The lamp which is arranged on or in the upper housing wall directly lights up the upper storage section, while the lower storage section is lit up by the lamp light which is reflected at the reflector. It is also possible, by a corresponding design of the reflector or by increasing the number of reflectors, for more than one section lying below the upper section to be lit up by the lamp arranged in the uppermost section.

Advantageous embodiments of the storage compartment according to the invention with expedient refinements and developments of the invention emerge from the other claims.

According to a preferred embodiment of the invention, the reflector is arranged on a pivoting cover which closes a receiving section which is accessible from the inside of the flap and is integrated in the flap. By means of this measure, the flap region, which is required for the attachment of the reflector, has a dual purpose, the pivoting cover accommodating the reflector which is formed as a foil. In the closed position of the cover, the reflector is optimally aligned to light up the lower section, and in the open position of the cover, an additional receiving section can be used.

According to an advantageous embodiment of the invention, the receiving section is designed to receive a pair of spectacles, and a mount for a pair of spectacles for putting the pair of spectacles in is formed on the rear side of the cover. The advantage of fastening the pair of spectacles on the rear side of the cover is that when the cover is swung out the pair of spectacles swings forwards in a manner which is favourable for taking hold of it.

BRIEF DESCRIPTION OF THE DRAWINGS

In the following text, the invention is described in more detail with reference to exemplary embodiments illustrated in the drawings, in which.

DETAILED DESCRIPTION OF THE DRAWINGS

Figure 1:
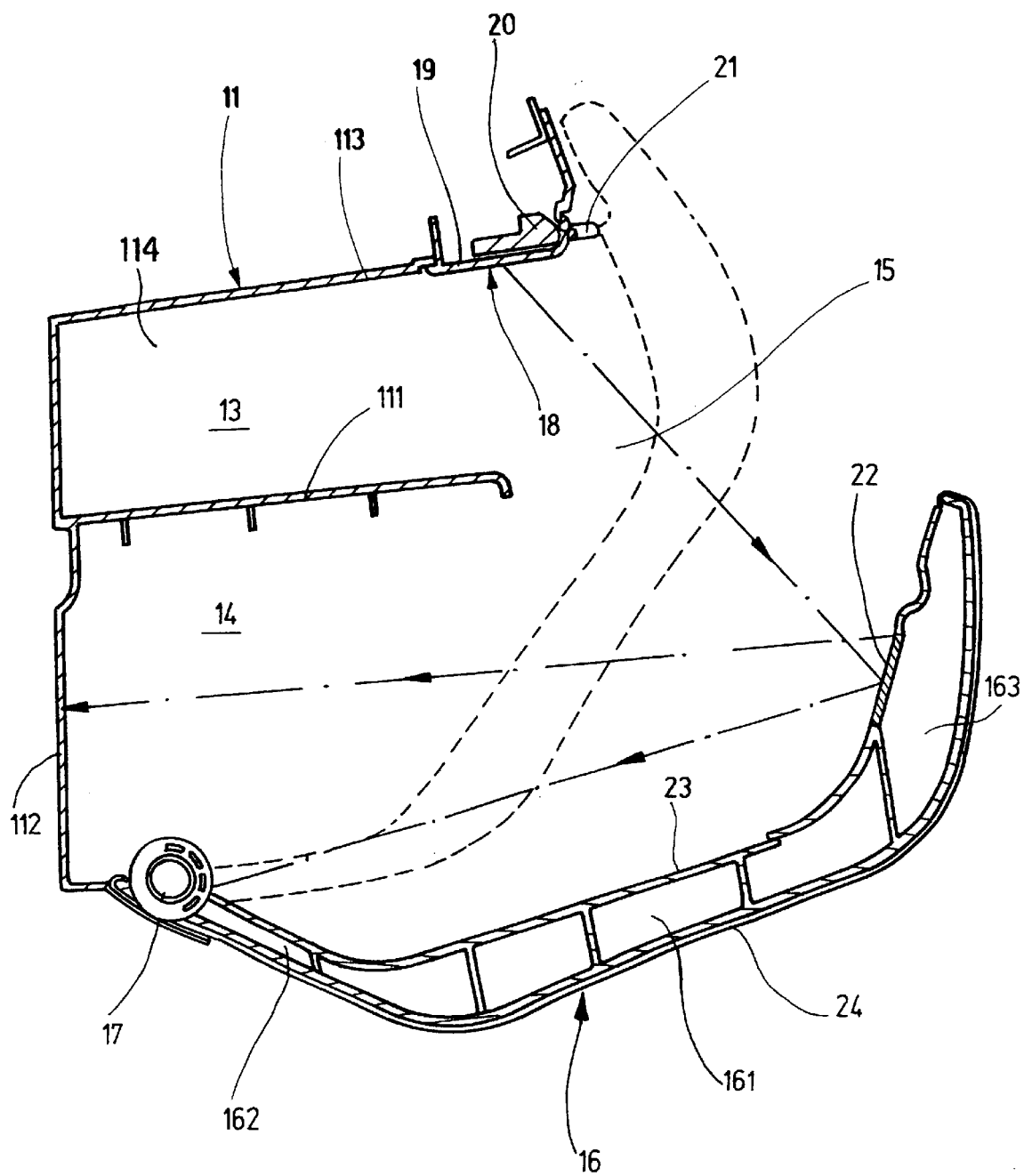
FIG. 1 shows a cross section of a glove compartment for a passenger car.

The glove compartment, which is shown in the opened state in cross section in FIG. 1, for installing into the dashboard of a passenger car, as an example of a general storage compartment for vehicles, has a compartment housing 11 with two sections 13, 14 which are arranged one above the other and are separated from one another by a transverse wall 111, and with a front-side compartment opening 15 allowing access to the sections 13, 14, and also has a flap 16 which is arranged pivotably on the lower side of the housing and in its closed position, indicated by dashed lines in FIG. 1, closes the compartment opening 15 and in its swung-down position, shown by solid lines in FIG. 1, protrudes downwards and forwards from the compartment opening 15. In this case, the compartment opening 15 on the lower side of the housing runs virtually as far as the rear wall 112 of the housing 11, which rear wall determines the depth of the housing. The housing has a top wall 113 and side walls 114. The flap 16, which is of double-shell design with the inner shell 23 and the outer shell 24 and a cavity lying in between, has a bow-shaped profile with a central part 161 and two obliquely protruding limb parts 162, 163 carrying on integrally from the central part on both sides. The one limb part 162 is coupled with its free end to the housing 11 on both sides in the vicinity of its rear wall 112 by means of two pivot bearings 17, of which only the one pivot bearing 17 can be seen in FIG. 1.

On the upper, transversely extending housing wall 113 there is arranged in the vicinity of the compartment opening 15 a downwardly shining lamp 18, of which FIG. 1 only shows a transparent covering 19, which is flush with the inner surface of the upper housing wall 113, and an electric switch 20. In the closed position of the flap 16, which is indicated by dashed lines in FIG. 1, an actuating pin 21 of the switch 20 is pressed in, as a result of which the switch 20 opens and interrupts the electric circuit of the lamp 18.

When the lamp 18 is switched on, the upper section 13 is illuminated in a sufficiently bright manner for even the objects deposited in the depth of the section 13 to be readily visible, while the lower section 14 is shaded by the transverse wall 112 and remains dark in its depth. In order to light up the lower section even deep within it, a reflector 22 is arranged on the inside of the flap 16 in such a manner that in the swung-down position of the flap 16, which is shown in FIG. 1, with the compartment housing 11 opened, the light impinging on the reflector 22 from the lamp 18 is reflected into the depth of the lower section 14. A typical path of two light beams is indicated by dash-dotted lines in FIG. 1. In the exemplary embodiment of FIG. 1, the reflector 22 is designed as a metal or glass mirror and inserted into the inner shell 23 in the limb part 163 of the flap 16.

Figure 2:
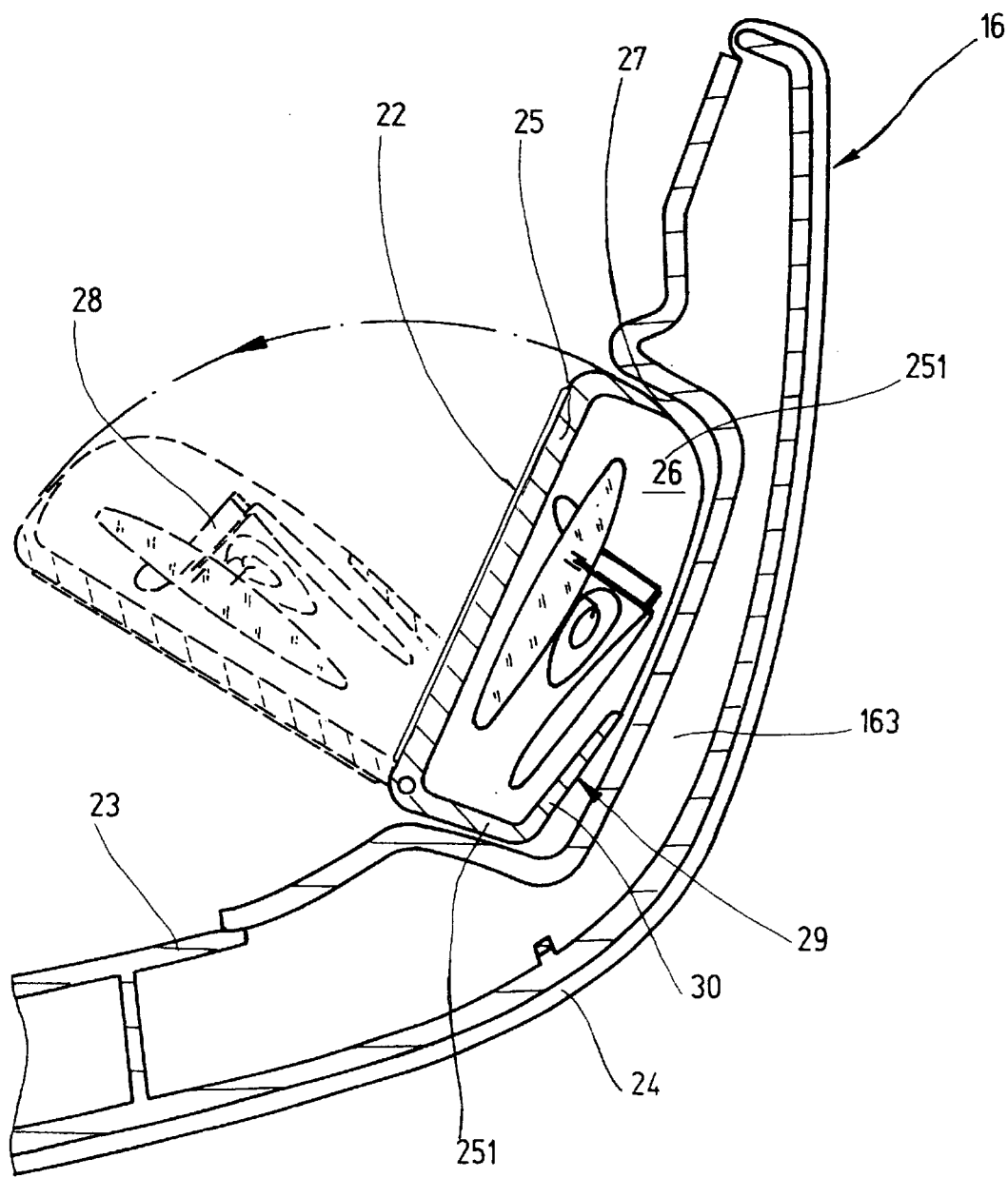
FIG. 2 shows an exerpt of a modified compartment flap for the glove compartment in FIG. 1.

In the exemplary embodiment of FIG. 2, the reflector 22, which is designed as a foil which is stuck on or spray-applied, is stuck on to a pivoting cover 25 which closes a receiving section 26 which is accessible from the inside of the flap 16 and is integrated in the flap 16. The receiving section 26 is formed by a moulding 27 of the inner shell 23 in the region of the limb part 163 of the flap 16 in which the pivoting cover 25 is pivotably arranged in such a manner that in its closed position it seals off the moulding 27 in a flush manner. When the flap 16 is in the swung-down position, the pivoting cover 25 is accessible in order to be operated and can now be transferred into its pivoted-down position, which is shown by dash-dotted lines in FIG. 2, and releases the receiving section 26.

In the exemplary embodiment of FIG. 2, the receiving section 26 is designed to receive a pair of spectacles 28. A mount 29 for a pair of spectacles is formed on the rear side of the pivoting cover 25, with the result that when the pivoting cover 25 is pivoted forwards, the pair of spectacles 28 which is inserted into the mount 29 for a pair of spectacles, is pivoted forwards at the same time and is therefore positioned in a manner which is favourable for the user to take hold of it. The pivoting cover 25 is of a shell-shaped design with a peripheral side edge 251 protruding at right angles, and the mount 29 for a pair of spectacles is formed by a retaining web 30 protruding integrally upwards at the free end of the lower side edge 251.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A storage compartment for vehicles, having a compartment housing including an upper, transversely extending housing wall, which is a top wall a rear wall and side walls, said compartment housing has at least two sections which are arranged one above the other and are separated from one another by a transverse wall, and a front-side compartment opening allowing access to the sections, and having a flap which closes the compartment opening and is arranged pivotably on a lower side of the housing in such a manner that when said flap is in a swung-down position, which releases the compartment opening, said flap protrudes forwards from the compartment opening, said storage compartment comprising:

a downwardly shining lamp (18) arranged in such a manner on the upper, transversely extending housing wall (113) of the compartment housing (11); and at least one reflector (22) arranged on an inner side of the flap (16) in such a manner that in the swung-down position of the flap (16) light from the lamp (18) which impinges on the reflector (22) is reflected into at least one lower section (14).

2. The storage compartment according to claim 1, wherein the reflector (22) is arranged on a pivoting cover (25) which closes a receiving section (26) which is accessible from the inner side of the flap (16) and is integrated in the flap (16).

3. The storage compartment according to claim 2, wherein the receiving section (26) is formed by a moulding (27) in an inner shell (23) of the flap (16).

4. The storage compartment according to claim 3, wherein the pivoting cover (25) seals off the moulding (27) flush with an inner wall of the inner shell (23).

5. The storage compartment according to claim 2 wherein the receiving section (26) is designed to receive a pair of spectacles (28), and wherein a mount (29) for the pair of spectacles is formed on a rear side of the pivoting cover (25), which rear side faces the receiving section (26).

6. The storage compartment according to claim 5, wherein the pivoting cover (25) is of a shell-shaped design with a peripheral side edge (251) and in that the mount (29) for the pair of spectacles is formed by a retaining web (30) protruding integrally from the peripheral side edge (251).

7. The storage compartment according to claim 2 wherein the reflector (22) is a foil which is adhered to the pivoting cover (25).

8. The storage compartment according to claim 1, wherein the compartment opening (15) on the lower side of the housing runs virtually as far as the rear wall (112) of the housing (11), which rear wall determines the depth of the housing, in that the flap (16) is of a double-shell design with a bow-like profile and a central part (161) and also has two obliquely protruding limb parts (162, 163) carrying on integrally from the central part on both sides, and in that a free end of the one limb part (162) is coupled to the housing (11) in the vicinity of the rear wall (112) and the other limb part (163) bears the reflector (22).

9. A storage compartment having a housing that includes an upper transversely extending top wall, a rear wall, and side walls, and an opening thereto, said storage compartment also includes a pivotal flap to selectively close said opening to said housing, said flap having a closed position whereby access to said opening is restricted and an open swung-down position which provides access to said opening, said storage compartment comprising:

a transverse wall separating said housing into two sections;

a lamp disposed at a level above said transverse wall; and a reflector cooperative with said lamp and disposed at a level below said transverse wall when said flap is in the open swung down position;

wherein said lamp is disposed on said upper transversely extending top wall and said reflector is disposed on said flap directing light to said opening.

10. The new storage compartment as set forth in claim 9, wherein said flap includes an inner surface and an outer surface, said inner surface disposed closer to said opening than said outer surface, said reflector being disposed on said inner surface of said flap.

11. The storage compartment as set forth in claim 10, wherein said flap includes a pivotal cover that is associated with a receiving section adapted to secure various articles therein.

12. The storage compartment as set forth in claim 11, wherein said reflector is disposed on said pivotal cover.

13. A storage compartment having a housing that includes an upper transversely extending top wall, a rear wall, and side walls, and an opening thereto, said storage compartment comprising:

- a pivotal flap to selectively close said opening to said housing, said flap having a closed position whereby access to said opening is restricted and an open swung-down position which provides access to said opening, said flap includes an inner and an outer surface; said flap having a bow-like profile with a central part and two obliquely protruding limb parts formed on opposing sides of said central part;

- a transverse wall separating said housing into an upper and a lower section;

- a lamp disposed on said upper transversely extending top wall capable of illuminating said upper section of said housing;

- a pivotal cover associated with a receiving section pivotally attached to the inner surface of one of said obliquely protruding limb parts of said flap;

- a reflector disposed on said pivotal cover and cooperative with said lamp while said flap is in said open position to direct light from said lamp into said lower section.

* * * * *